United States Patent [19]
Maddox

[11] Patent Number: 4,859,108
[45] Date of Patent: Aug. 22, 1989

[54] BLIND FASTENER

[75] Inventor: Charles G. Maddox, Kent, Ohio

[73] Assignee: The B.F. Goodrich Company, Akron, Ohio

[21] Appl. No.: 169,553

[22] Filed: Mar. 17, 1988

[51] Int. Cl.$^4$ .............................................. B25G 3/28
[52] U.S. Cl. .................... 403/277; 403/279; 403/282; 403/403; 403/407.1; 411/34; 411/175
[58] Field of Search ............... 403/403, 282, 279, 277, 403/405.1, 406.1, 407.1; 72/391; 411/34, 35, 36, 37, 38, 55, 174, 175

[56] References Cited

U.S. PATENT DOCUMENTS

| | | | |
|---|---|---|---|
| 2,887,926 | 5/1959 | Edwards | 411/38 |
| 3,461,771 | 8/1969 | Briles | 403/408.1 X |
| 3,789,728 | 2/1974 | Shackelford | 411/34 |
| 3,967,432 | 7/1976 | Starr | 411/970 |
| 4,601,621 | 7/1986 | Permoda | 403/403 X |
| 4,753,561 | 6/1988 | Betterton | 403/407.1 X |

Primary Examiner—Randolph A. Reese
Assistant Examiner—Franco DeLiguori
Attorney, Agent, or Firm—Joseph Januszkiewicz

[57] ABSTRACT

A blind hollow fastener with a slotted head and a depending tubular sleeve with a bore extending therethrough for use on a thin vertically disposed plate. The plate is slotted to receive the fastener with the slotted head engaging the side surfaces of the plate while the upsetting action on the tubular sleeve above its lower internal threaded portion engages notches that extend out away from the slot in the plate.

11 Claims, 3 Drawing Sheets

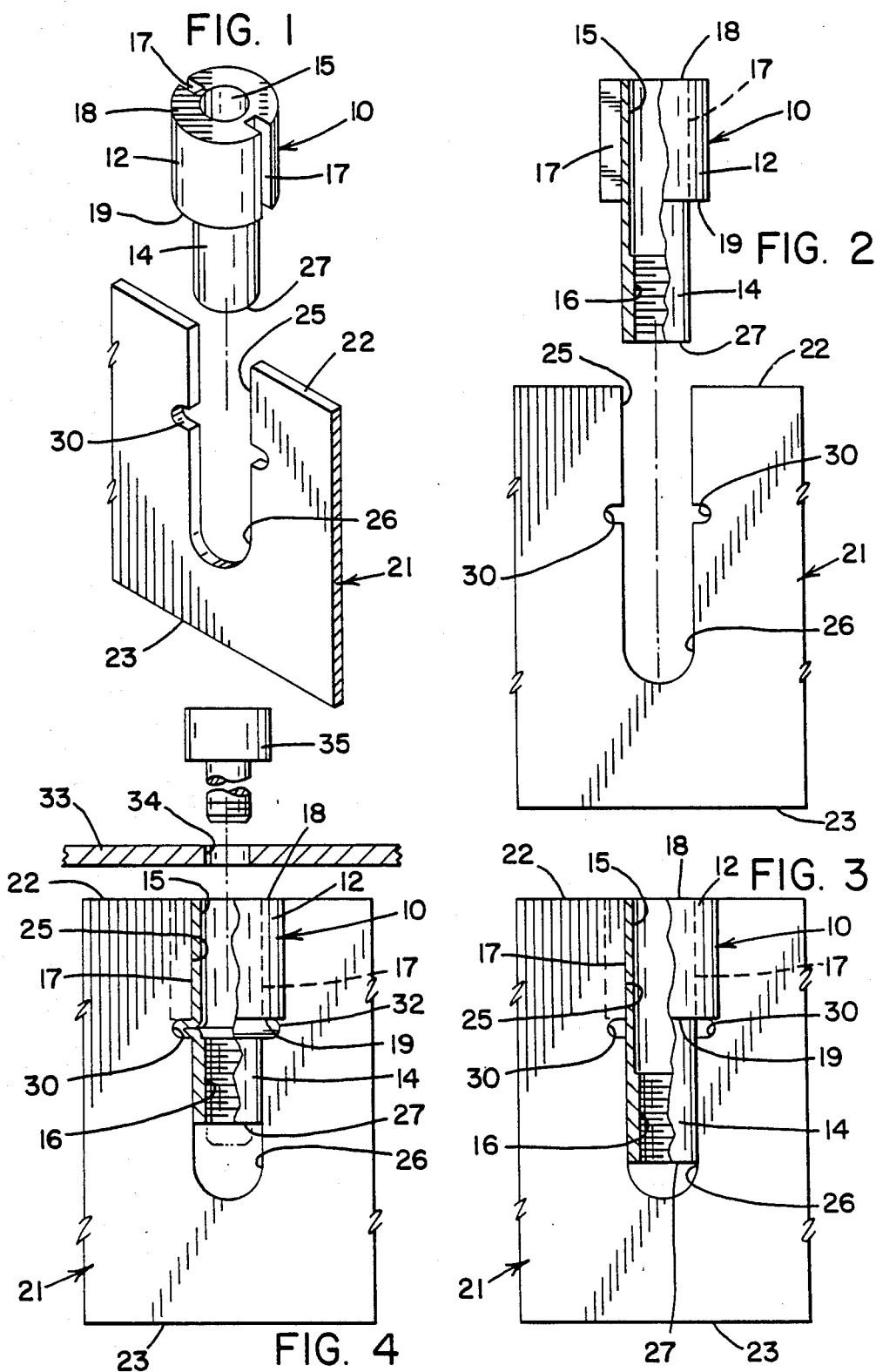

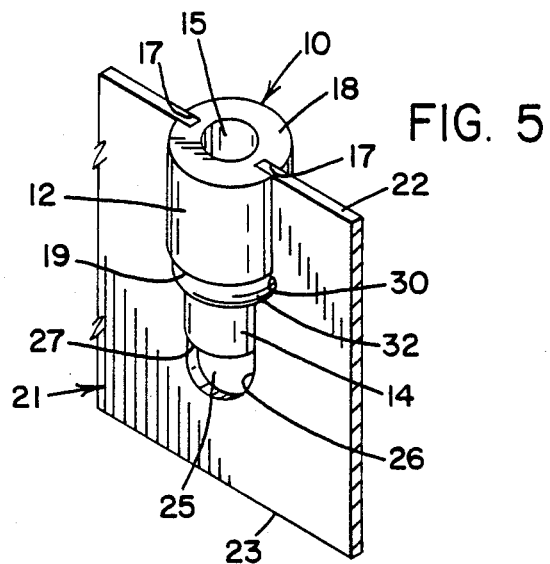
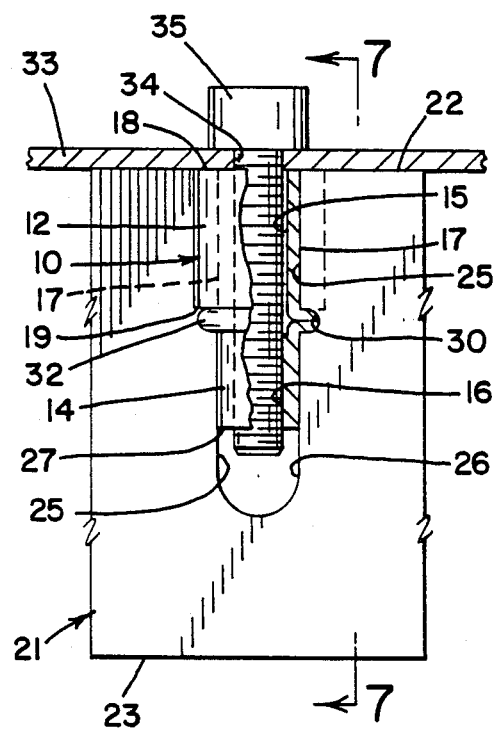 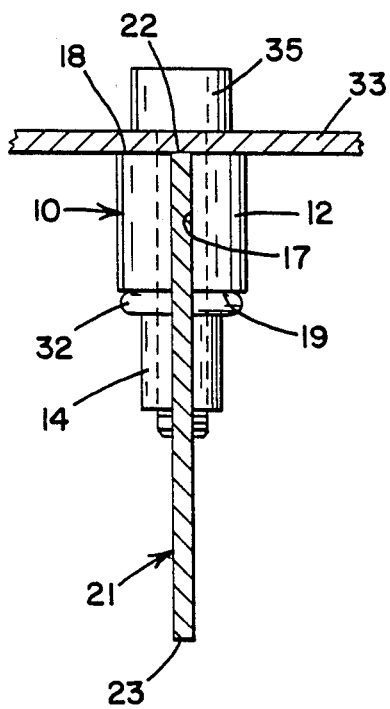
FIG. 5
FIG. 6
FIG. 7

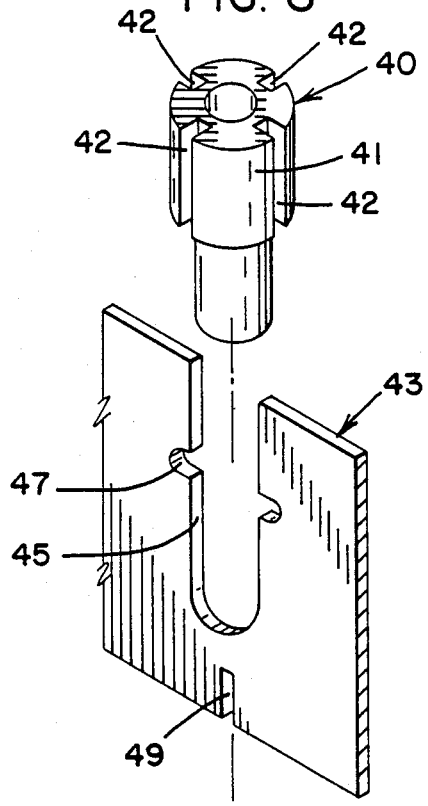
FIG. 8
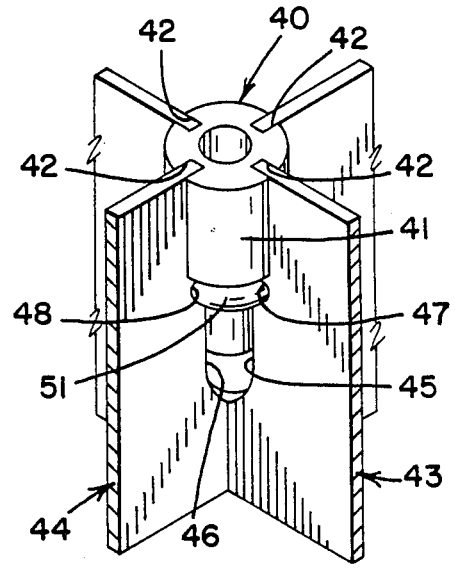
FIG. 9
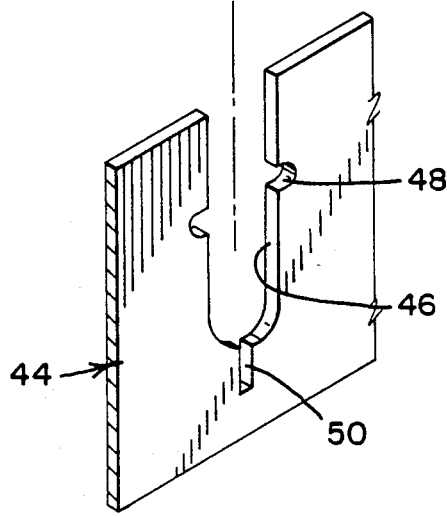
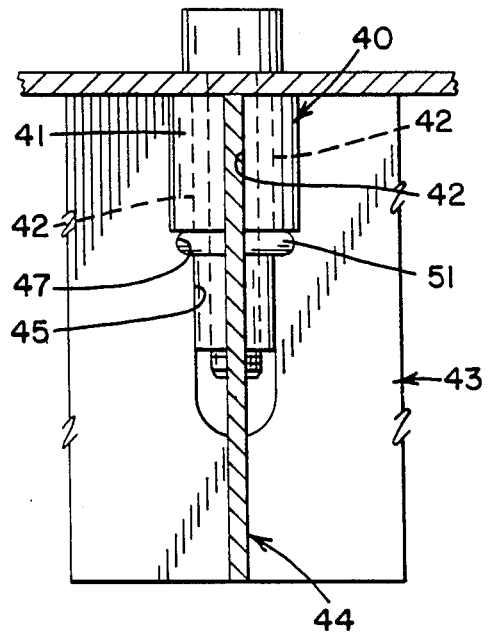
FIG. 10

BLIND FASTENER

BACKGROUND OF THE INVENTION

This invention relates to fasteners and more particularly to thread locking type blind fasteners that can be installed into a narrow flat structural sheet member wherein provision is made to suitably anchor such fastener to permit torquing of the fastener once installed without encountering any spin of the fastener. Such blind fasteners are used where it is not possible to drill and tap the structural sheet member since it is a narrow flat connecting structural plate member of thin material.

Various designs of blind fasteners have been made which consist of a flat head and a threaded tubular body, which tubular body can be inserted through a hole in a structure and expanded to bear against the back or blind side of the structure and secure such fastener, after which the threaded portion can function as a stationary nut for fastening the desired external component thereto. In the present invention the structural plate member itself is a thin very narrow strip of material and cannot physically be tapped or threaded when viewed as a strip in a vertical direction. Generally in this kind of structure special structures are made and fastened first to the thin structural member as disposed in its vertical direction as by welding another member thereto and then these special structures provide the means by which a fastener is attached thereto. In the present invention the fastener alone can be attached to a vertically disposed narrow strip of material by cutting a small narrow longitudinally extending elongated hole into the plane of the material in contradistinction to a circular hole in a flat plate and thence secure the fastener to the narrow material by expanding a portion of the fastener for gripping the vertically disposed structural material. The head end of the fastener which has a thicker wall portion than the remainder of the fastener has slots cut into the head which are slidingly and frictionally received by the narrow strip of the structural material or sheet member which prevents rotation and acts as an anti-torque device to stabilize any movement. The upsetting process expands a small portion of the fastener into notches cut into the narrow elongated hole or slot in the narrow strip of material or the thin structural member which prevents pullout. Such fastener is simple in construction and inexpensive, providing for maximum strength against pulling out of the hole as well as against slippage or rotation.

SUMMARY OF THE INVENTION

A method of fastening a blind fastener into the plane of a thin structural sheet member. The blind fastener has a hollow tubular body or sleeve and a head portion with a central bore therethrough. The central bore of the fastener at the head portion and part of the adjoining tubular body is of a larger diameter than the remaining bore of the tubular body. Such remaining bore of the tubular body is threaded. The tubular body and head is insertable into a fastening hole that extend into the plane of the flat thin structural member such that the head also extends into the structure. A pair of notches are cut into the sides of the fastening hole below the top edge to accommodate the securing of the fastener thereto. A draw rod is threaded into the threaded bore of the tubular body and tensioned to upset the tubular body thereby expanding that portion of the tubular body that is adjacent the head to extend such bulging into the notches to effectively capture the blind fastener to the structural member. The head portion has a pair of slots that slide over the thin narrow strip of material to facilitate the torquing of the blind fastener when attaching a bolt to the central bore thereof.

BRIEF DESCRIPTION OF THE DRAWINGS

FIG. 1 is an exploded isometric view of a flat structural member with a slot therein and a fastener directly above;

FIG. 2 is an exploded side elevational view of a flat structural member and a fastener as shown in FIG. 1 with a portion of the fastener broken away to show the central bore thereof;

FIG. 3 is a side elevational view of the flat structural member of FIGS. 1 and 2 with the fastener partially installed thereon, with the fastener partially broken away;

FIG. 4 is a side elevational view of the flat structural member of FIGS. 1 and 2 with the fastener partly broken away installed and about to receive a bolt and a flat sheet to be secured thereto;

FIG. 5 is an isometric view of the fastener installed in the thin flat structural member as depicted by FIG. 3;

FIG. 6 is a side elevational view of the fastener installed in the flat structural member as depicted by FIG. 4 with a flat sheet and bolt secured thereto;

FIG. 7 is a cross sectional view of the fastener installed in the structural member taken on line 7—7 of FIG. 6;

FIG. 8 is a second embodiment showing an exploded isometric view of a pair of flat structural members with slots therein that are to be joined as intersecting plates by a fastener member directly above them;

FIG. 9 is an isometric view of a pair of intersecting flat structural members joined at their juncture by a fastener depicted by FIG. 8;

FIG. 10 is a side elevational view of a pair of intersecting flat structural members and a fastener as depicted by FIG. 9 with a plate attached thereto as by a bolt secured to the fastener.

DETAILED DESCRIPTION

Referring to the drawings wherein like reference numerals refer to like elements or corresponding parts in the several views, there is shown in FIGS. 1 and 2 a blind hollow fastener 10 having an upper longitudinally extending cylindrical head 12 and a lower longitudinally extending sleeve portion 14. The fastener 10 has a central bore with an upper bore portion 15 and a lower threaded bore portion 16. The upper bore portion 15 which is unthreaded extends through the head 12 and into the adjoining portion of sleeve 14. The diameter of the bore 15 is greater than the diameter of lower threaded bore portion 16. The thickness of the wall of the threaded portion 16 of the sleeve 14 is greater than the wall of the unthreaded portion of the bore 15 of the sleeve 14 to facilitate an upsetting action of the fastener to be described. The length of the cylindrical head 12 is shown as slightly less in length than the length of sleeve portion 14 although such length of cylindrical head 12 may equal to or be greater than the length of sleeve portion 14. The external diameter of head 13 is substantially greater than the external diameter of sleeve 14. Head 12 has a pair of diametrically opposed slots 17 that extend from the upper annular suface 18 of the head to the lower annular surface 19 of such head. The sleeve portion 14 is also referred to as a tubular body.

Also shown in FIGS. 1 and 2 is a fragmentary portion of a narrow thin structural plate or sheet member 21 having an upper edge 22 and a lower edge 23. The thinness of plate member 21 is compared to the external diameter of the sleeve or tubular body 14 of fastener 10. A longitudinally extending fastening hole or slot 25 is cut into structural plate member 21 extending from the upper edge 22 down into plate member 21 for a distance equal to a length preferably the full length of the fastener 10. The very end of hole 25 is shown as arcuate in shape, however such shape may be angular with the object being to extend the depth of the hole 25 into plate member 21 to a point 26 where the very end 27 of the fastener will seat and position the upper annular surface 18 of the fastener 10 in line with the upper edge 22 of the plate member 21. The width of the hole 25 is substantially equal to the external diameter of the sleeve 14 with sufficient clearance to accept the sleeve 14. A laterally extending notch 30 is cut into each side of slot 25 and into plate member 21 approximately one-half of the way down hole or slot 25. The location of such notch is dependent on where one wishes to upset the fastener 10 as to be described.

Fastener 10 is positioned over and in alignment with the hole 25 in plate member 21. As the fastener 10 is lowered into hole 25, the sides of slot 17 in head 12 slidingly engage the side surfaces of plate member 21 while the sleeve portion 14 of fastener 10 is located in the fastener hole 25.

The fastener 10 is firmly secured within the hole 25 of plate 21 by screwing the tip of a high strength threaded draw rod into the threaded bore portion 16 of sleeve 14 and while bearing against the upper annular surface 18 of fastener 10 as by an anvil to keep the fastener in position, an upward tension is applied to the draw rod to upset the thin walled portion of sleeve 14 (the unthreaded portion in sleeve 14) adjacent to the head 12 and adjacent to the thick walled threaded bore portion 16 which action effects a bulging or outward folding in such location as at 32 depicted in FIG. 4. The bulged or buckled portion 32 enters into notches 30 since the notches offer no resistance to the formation of the bulge and once the bulge is formed such bulge prevents the fastener from being withdrawn from the plate member 21 while the slots 17 in the head 12 prevents the rotation of the fastener 10 as well as acting as an anti-torque device. The use of upsetting tools is old and well known in the blind fastener art and reference is made to U.S. Pat. No. 3,461,771, U.S. Pat. No. 2,641,378 and U.S. Pat. No. 3,861,185.

Thereafter (as depicted by FIG. 4) a flat sheet metal plate member 33 can be secured into abutting relationship to the upper edge of plate member 21 by first drilling a circular hole 34 into such plate member 33 of a size at least equal to the threaded bore 16 of sleeve 14 and thence using a bolt 35 to screw into such fastener 10 such that the head of bolt 35 will fasten the plate member 33 to the structural plate member 21 at right angles thereto.

A modification of the above described invention is shown in FIGS. 8 through 10 wherein a fastener 40 is identical to the described fastener 10 except that the head 41 of fastener 40 has four slots 42 in lieu of the two slots to permit its use with a pair of intersecting plate member 43-44. Hereinafter when referring to these slots reference will be made to plurality which shall mean more than two. The fastening holes in plate members 43 and 44 (at the junction thereof) are designated 45-46 and are identical to hole 25 in plate member 21 of the first embodiment, and also having notches 47-48 respectively which are identical to the notch 30 in plate member 21 as described above. Plate members 43-44 are also recessed as at 49-50 respectively so that plate member 43 will be received by plate member 44 as depicted by FIG. 9. Fastener 40 is then located within the intersecting holes or aligned holes 45-46 in plate member 43-44 and upset in the same manner as discussed in the first embodiment whereby the bulged portion 51 will frictionally engage the side edges of the notches 47-48 in the plate members 43 and 44 to secure such plate members into interlocking relationship.

With the use of such fasteners 10 and 40 it is possible to provide threads (via the threaded sleeves of the fasteners) into the edge of the sheet material or structural members which permits the joining of several thin sheets of structural members together. Such fasteners permit current commercially available tooling to form the slots and recesses to provide an economical means for joining such thin sheets of structural members With respect to the method of using the fasteners 10 and 40 to provide a threaded receptacle for a narrow or thin sheet of a structural member or to join two thin sheets of a material, the following general procedure is followed. In the case of a thin narrow flat structural sheet member 21 with a top edge 22, a bottom edge 23 and two side surfaces, an elongated fastening hole 25 is first cut into the plane of the structural member extending from the top edge into the body portion of the sheet member. A pair of notches 30 are then cut into each side surface of sheet member 21 communicating with hole 25. Such hole 25 is an elongated hole extending into and lying in the plane of said structural member 21. The fastener 10 is then positioned into the hole 25 such that the slots 17 register with the side surfaces of the structural member 21 so that the sleeve or tubular body 14 of fastener 10 is slidingly received by the side edges of the elongated hole 25. With the use of a draw rod, an upward tension is applied to the sleeve 14 to upset or bulge that portion of sleeve 14 adjacent to head 12 such that the bulged portion 32 frictionally engages the notches 30 to firmly secure the fastener to the structural member 21.

With respect to the method of fastening two thin sheets of material as depicted in FIGS. 8-10, the general procedure is the same as discussed above except that the elongate holes are cut into the sheet structural members at their juncture as depicted by FIGS. 8 and 9 and that the head 41 of fastener 40 is slotted at four places so as to slidingly engage the side surfaces of the two intersecting sheet members 43 and 44.

Various modifications are contemplated and may obviously be resorted to by those skilled in the art without departing from the described inventions, as hereinafter defined by the appended claims, as only a preferred embodiment thereof has been disclosed.

I claim:

1. A narrow flat structural member with at least one fastener insert therein; said narrow flat member having one edge and an oppositely disposed other edge along with a body portion, at least one fastening hole extending through said one edge and into the body portion, said fastening hole defining oppositely disposed side portions in said body portion, said fastening hole having a notch extending into both side portions and communicating with said hole, a fastener having a head and a sleeve that is received by said fastening hole, said head having a pair of narrow slots that frictionally engage said side portions of said body portion, said fastener having a central bore, said central bore of said fastener having at least a portion thereof threaded, said fastener sleeve having a bulged portion engaging said notches to locate said fastener in said narrow flat member.

2. A narrow flat structural member as set forth in claim 1 wherein the inside diameter of said threaded portion of said central bore of said sleeve is a smaller diameter than the diameter of that portion of said sleeve that lies above said threaded portion.

3. A narrow flat structural member as set forth in claim 2 wherein said heat of said fastener is of a greater outside diameter than said sleeve, and said head is a longitudinally extending cylinder.

4. In a pair of flat structural sheet members with at least one fastener attached thereto; said sheet members having top and bottom intersecting edges and side surfaces, the juncture of said intersecting sheet members being recessed to define a fastening hole; each of said sheet members being notched to define four notch recesses that communicate with said hole; a fastener in said hole and secured to said sheet members; said fastener having a head and a sleeve portion depending from said head; said fastener having a central bore with an upper unthreaded portion and a threaded portion; said threaded portion being in said sleeve portion; said unthreaded portion being of a greater inside diameter than said threaded portion; the uppermost portion of said head having an annular surface; said head being of a greater external diameter than said sleeve portion; said head having a plurality of narrow slots that engage the respective side surfaces of said intersecting sheet members; and said sleeve portion adjacent said head having a bulged portion received by said notch recesses to secure said fastener to said sheet members.

5. In a pair of flat structural sheet members as set forth in claim 4 wherein said annular surface of said uppermost portion of said head is in the same planar surface as said top intersecting edges of said sheet members.

6. A method of securing a hollow fastener having a slotted head and a depending tubular sleeve with a threaded bore therein to a narrow flat structural member wherein said member has two side surfaces, an upper edge and a lower edge; cutting a fastening slot into said structural member that extends from one of said edges into said member toward the remaining one of said edges; cutting a pair of small notches relative to said slot into said structural member that communicates with said slot of said structural member; sliding said fastener into said slot of said structural member so that said slots of said head frictionally engage said side surfaces of said flat structural member, and upsetting a portion of said fastener into an annular bulge to engage said notches to secure said fastener into said structural member.

7. A method of securing a fastener to a narrow flat structural member as set forth in claim 6 wherein said cutting of a hole into said structural member is a cutting of an elongated hole extending into the plane of said structural member.

8. A method of securing a fastener to a narrow flat structural member as set forth in claim 7 wherein said fastening hole is extended into said structural member at a distance equal to the length of said fastener.

9. A method of securing a fastener to a narrow structural member as set forth in claim 6 wherein said cutting of said slots in said structural member is a U-shaped hole as viewed perpendicular to said plane of said structural member.

10. A method of securing a fastener to a pair of intersecting thin walled sheet members wherein each sheet member has two sides, upper edges and lower edges; cutting a fastening slot into each of said sheet members at the juncture of said members to extend from said upper edges at said juncture into said members; cutting small notches into the sides of said sheet members for communicating with said fastening slot; sliding a hollow threaded fastener with slots in the head portion of such threaded fastener into said slots of said sheet members with said slots of said fastener engaging the sides of said sheet members; and upsetting said fastener to form an annular bulge to engage said notches in said sheet members.

11. A method of securing a fastener to a pair of intersecting thin walled sheet members as set forth in claim 10 wherein said fastening slots extend into said sheet members from said top edge at least the distance of the length of said fastener.

* * * * *